United States Patent
Schinazi et al.

(10) Patent No.: US 8,141,291 B2
(45) Date of Patent: Mar. 27, 2012

(54) MOSQUITO TRAP WITH IMPROVED AIRFLOW

(75) Inventors: Alan Schinazi, Providence, RI (US); Michael C. Vieira, Fall River, MA (US)

(73) Assignee: Woodstream Corporation, Lititz, PA (US)

( * ) Notice: Subject to any disclaimer, the term of this patent is extended or adjusted under 35 U.S.C. 154(b) by 904 days.

(21) Appl. No.: 12/058,516

(22) Filed: Mar. 28, 2008

(65) Prior Publication Data

US 2008/0236025 A1 Oct. 2, 2008

Related U.S. Application Data

(60) Provisional application No. 60/909,404, filed on Mar. 30, 2007.

(51) Int. Cl.
*B64D 19/00* (2006.01)
(52) U.S. Cl. ............................. 43/139; 43/138
(58) Field of Classification Search ................ 43/139, 43/138
See application file for complete search history.

(56) References Cited

U.S. PATENT DOCUMENTS

| | | | |
|---|---|---|---|
| 662,489 A | 11/1900 | Fulton | |
| 1,671,404 A | 5/1928 | Cherry | |
| 1,693,368 A | 11/1928 | Cherry | |
| 1,807,550 A | 5/1930 | Rector | |
| 2,806,321 A | 5/1956 | Blackman | |
| 2,893,161 A | 7/1959 | Reid | |
| 3,196,577 A | 7/1965 | Plunkett | |
| 4,384,792 A | 5/1983 | Sommers et al. | |
| 4,519,776 A | 5/1985 | DeYoreo et al. | |
| 4,785,573 A | 11/1988 | Millard | |
| 5,157,865 A | 10/1992 | Chang | |
| 5,205,064 A | 4/1993 | Nolen | |
| 5,205,065 A | 4/1993 | Wilson et al. | |
| 5,241,779 A | 9/1993 | Lee | |
| 5,255,468 A | 10/1993 | Cheshire, Jr. | |
| 5,301,458 A | 4/1994 | Deyoreo et al. | |
| 5,417,009 A | 5/1995 | Butler et al. | |
| 5,647,164 A | 7/1997 | Yates | |
| 5,669,176 A | 9/1997 | Miller | |
| 6,145,243 A | 11/2000 | Wigton et al. | |
| 6,286,249 B1 * | 9/2001 | Miller et al. | 43/139 |
| D466,579 S | 12/2002 | Spiro et al. | |
| 6,574,914 B2 * | 6/2003 | Smith | 43/113 |
| 6,594,946 B2 | 7/2003 | Nolen et al. | |
| 6,655,078 B2 | 12/2003 | Winner et al. | |
| 6,840,005 B2 | 1/2005 | Durand et al. | |
| 6,892,492 B2 | 5/2005 | Durand et al. | |
| 6,898,896 B1 * | 5/2005 | McBride et al. | 43/113 |
| 7,074,830 B2 | 7/2006 | Durand et al. | |
| 7,181,885 B2 | 2/2007 | Spiro et al. | |
| 7,243,458 B2 | 7/2007 | Miller et al. | |
| 7,281,351 B2 | 10/2007 | Durand et al. | |
| 7,832,140 B2 * | 11/2010 | Wilbanks | 43/112 |
| 2003/0154643 A1 | 8/2003 | Spiro et al. | |
| 2003/0208951 A1 | 11/2003 | Bossler | |

(Continued)

*Primary Examiner* — Christopher P Ellis
(74) *Attorney, Agent, or Firm* — Jacobson Holman PLL

(57) ABSTRACT

An insect trap including a suction device to suck insects into a catch where they are killed or detained. The insect trap also includes a catalytic reactor that uses a portion of the air and a combustible fuel to produce $CO_2$. The $CO_2$ is expelled from the trap at one end and the intake air is sucked in at the other. Intake and outlet ports for the intake air and lure respectively are angled toward each other. Accordingly, more insects that are drawn to the lure become trapped in the intake air.

25 Claims, 3 Drawing Sheets

U.S. PATENT DOCUMENTS

| | | | |
|---|---|---|---|
| 2005/0066570 A1* | 3/2005 | Mosher et al. | 43/139 |
| 2005/0210737 A1 | 9/2005 | Durand et al. | |
| 2006/0242888 A1 | 11/2006 | Bedoukian | |
| 2007/0043335 A1 | 2/2007 | Olsen et al. | |
| 2008/0066373 A1* | 3/2008 | Miller et al. | 43/139 |
| 2009/0000183 A1* | 1/2009 | Geier et al. | 43/139 |

* cited by examiner ered with the intake air 10. However, if the trap is held close to the ground, the outlet air will be forced out of the trap, hit the ground, and recirculate into the trap with the intake air. Accordingly, the $CO_2$ will not serve as an efficient lure.

MOSQUITO TRAP WITH IMPROVED AIRFLOW

This application claims the benefit of U.S. Provisional Application 60/909,404, filed Mar. 30, 2007, the entire disclosure of which is incorporated by reference.

FIELD OF THE INVENTION

The present invention generally relates to an insect trap, and specifically relates to a $CO_2$ insect trap with an improved air flow into and out of the trap.

BACKGROUND OF THE INVENTION

Insect traps that use $CO_2$ as a lure are highly effective and can eliminate the nuisance of biting insects, such as mosquitoes, over a large area. The traps are able to lure insects from distances much farther than lights, because the insects will seek out the source of $CO_2$, even if it is not in their line of sight. $CO_2$ traps are also more effective during the day than light traps. $CO_2$ traps also preferentially trap biting insects, leaving the harmless or beneficial insect populations unharmed. Typically, the $CO_2$ is produced from a combustible fuel that is held at high pressure in a fuel source, such as a tank. Accordingly, $CO_2$ traps can effectively operate for long periods of time. This provides a distinct advantage over other luring devices, such as candles.

Known $CO_2$ traps are effective for catching and either killing or detaining insects. Many $CO_2$ insect traps include a counter-flow construction, where the intake air is sucked into the trap along a first path in one direction and the output air is ejected along a second path immediately adjacent the intake air. Further, the first path of intake air typically surrounds the second path of output air. Thus, the first path of air effectively creates a cone around the second path of air, where the two flows are principally moving in parallel but opposite directions. This configuration operates acceptably if the trap is held away from the ground, so that the output air can disperse and is not contained entirely within the cone of input air. However, if the trap is held close to the ground, the outlet air will be forced out of the trap, hit the ground, and recirculate into the trap with the intake air. Accordingly, the $CO_2$ will not serve as an efficient lure.

Thus, there is a need for an insect trap that does not include a counter flow arrangement.

SUMMARY OF THE INVENTION

The present invention provides a $CO_2$ insect trap with an improved airflow. The airflow is generated using a suction device, such as a blower or fan, for pulling intake air into the trap along an intake path. The intake air carries insects, for example mosquitoes, along with it into the trap. A catch included in the trap catches the insects preventing them from escaping. The catch can take various forms. For instance, it may be a rigid container with webbing or small holes, or it can be a net bag.

The trap can also include a device to kill the insects once they are caught. $CO_2$ is emitted from the trap in order to lure insects close enough that they are sucked in by the intake air. The $CO_2$ is produced from a combustible fuel in a catalytic reactor. The combustible fuel is mixed with at least a portion of the intake air and the mixture is oxidized on the catalyst to produce $CO_2$ and $H_2O$. The reaction products are emitted from the trap in order to lure insects. The $CO_2$ can be mixed with some of the incoming air after it has been produced to help carry it away from the trap along a lure path. The rest of the air may be expelled as waste air.

The intake air flows through an intake port at one end of the trap and the $CO_2$ lure flows out of the trap through an outlet lure port at the other end of the trap. Each of the intake port and outlet lure port are angled toward an opposite end of the trap. Accordingly, the intake path and the lure path are angled toward each other with respect to a radial direction of the trap.

In one embodiment, the intake port may reside at the top of the trap and the $CO_2$ may project from the bottom of the trap. In another embodiment these positions are reversed, with the intake port at the bottom and the $CO_2$ port at the top.

The intake port for the intake air may be formed around one end of the trap. The intake port may also be angled toward the opposite end of the trap. The exit or outlet port for the lure is situated at the opposite end of the trap. The exit port is directed somewhat towards the intake so that the lure path is angled in a direction of the intake path. Thus, the exiting lure projects outward and toward the intake air which is traveling inward. Having the lure project toward the origin of the intake air provides an advantage because insects drawn to the lure can easily get caught in the intake path.

The waste path may project straight down, creating a warm plume of air beneath the trap, further increasing the trap's attractiveness to biting insects.

Both the intake and the lure outlet ports may be arranged circumferentially around the body of the trap, where each is comprised of more than one port. Furthermore, the separation of the inlet and outlet permits the more effective use of luminosity changes in the outer housing to maximize the visual attractiveness of the inlet for a biting insect.

BRIEF DESCRIPTION OF THE DRAWING

These and other objects and features of the invention will become more apparent by referring to the drawing, in which.

DETAILED DESCRIPTION

Figure 1:
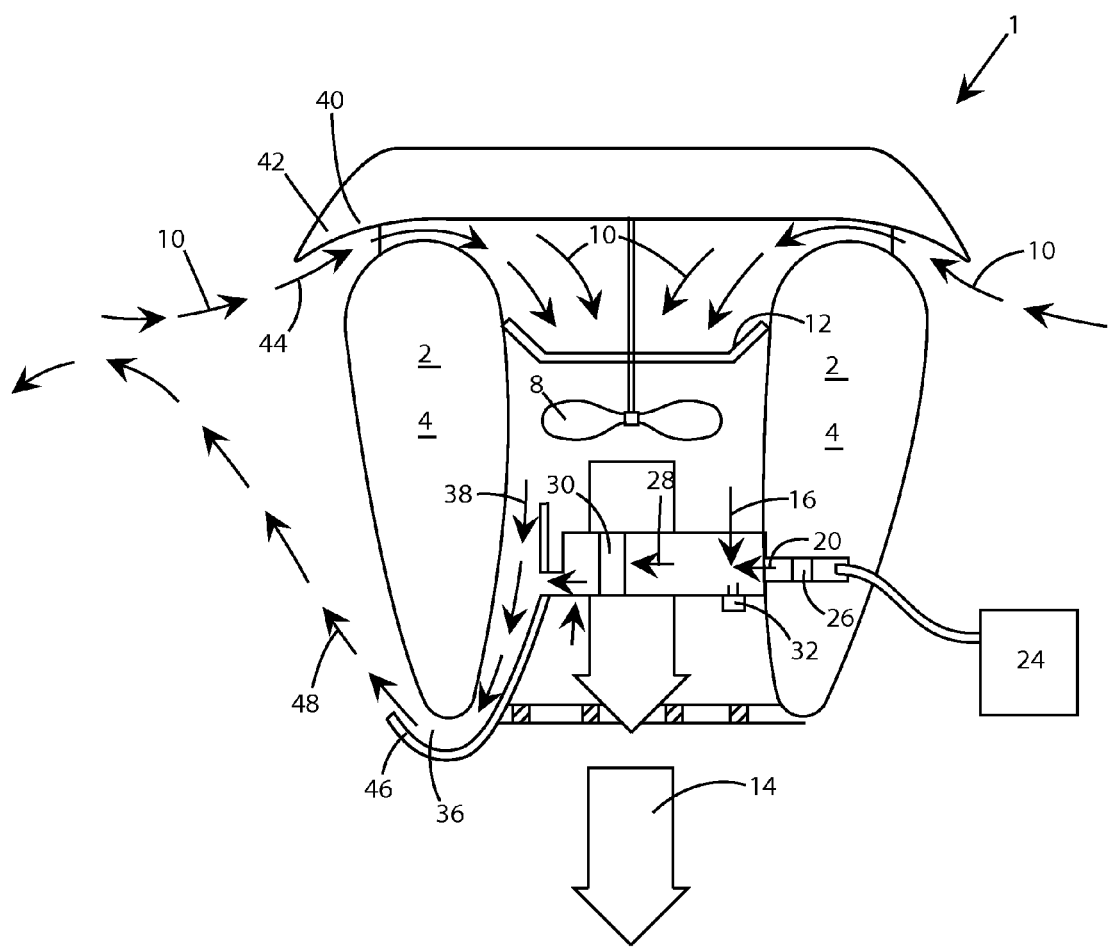
FIG. 1 is a cross sectional side view of an embodiment of an insect trap according to the present invention.
Figure 2:
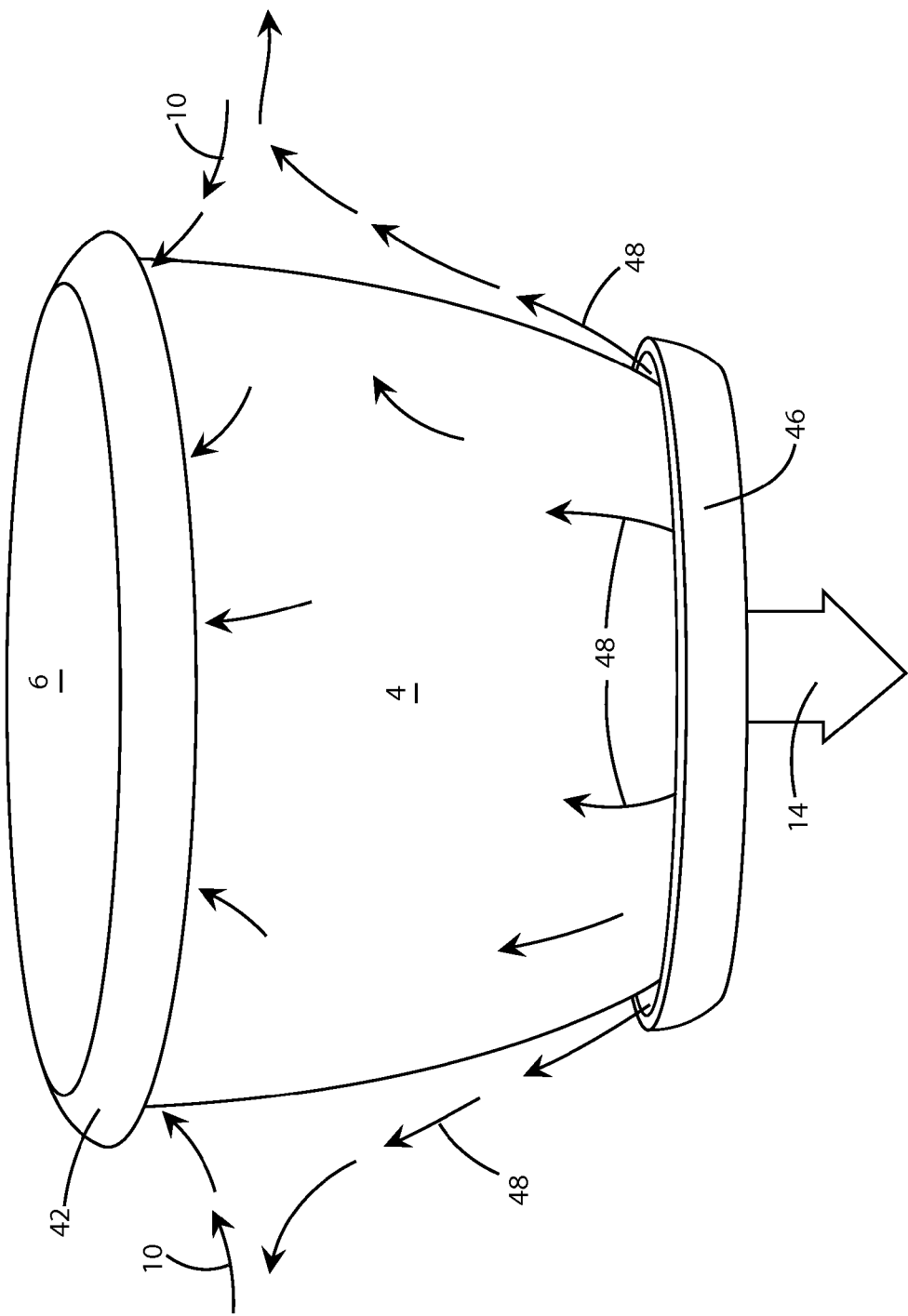
FIG. 2 is a perspective front view of the insect trap of FIG. 1.

FIGS. 1 and 2 show an insect trap 1 in accordance with an embodiment of the present invention. The trap 1 includes a housing 2 formed of sidewalls 4 and a top 6. Within housing 2 is a suction device 8. The suction device 8 can be a rotational unit that is driven by a motor or an engine. For example the suction device 8 can be a blower or a fan. The suction device 8 is shown diagrammatically in FIG. 1 as two rotor blades. The object of suction device 8 is to draw air through the $CO_2$ trap 1 and any known method can be used.

Intake air 10 is pulled into the trap 1 at the top of the housing by suction device 8. Along with the intake air 10, insects are sucked into the trap. Once within the housing 2, the intake air 10 passes through a catch 12 wherein the insects contained in the air stream are captured. The catch 12 may be located upstream of the suction device 8, as shown in FIG. 1, or it may be downstream of the suction device 8. After passing through the catch 12 and suction device 8, or blower, the air is separated for various uses. Much of the air passes directly through trap 1 as waste air 14. A first portion 16 of the intake air 10 is used in the reactor 18 to create $CO_2$. The first portion 16 of air is combined with a combustible fuel 20 in the reactor 18. The combustible fuel 20, which may be a hydrocarbon-based gas is fed to the trap 1 from a fuel source, such as tank 24.

In the reactor 18, the first portion of air 16 is mixed with combustible fuel 20 and oxidized. To initiate the reaction, a spark generator 32 is included in the reactor 18. The spark generator 32 may produce a single spark once the suction device 8 is in operation and the combustible fuel 20 is being fed into the reactor. The spark initializes the reaction, which is subsequently self sustaining until the flow of combustible fuel 20 and air is stopped. Downstream of the spark generator 32, the reactants are fed through a catalyst 30 that is part of reactor 18. Once heated, the oxidation reaction takes place on the catalyst 30. The mixture emerging from the catalyst is rich with $CO_2$, and though it also contains nitrogen, water and other products, it will be referred to only as $CO_2$. The $CO_2$ 34 leaves the reactor 18 and is swept through outlet lure port 36 by a second portion of air 38. The second portion of air 38 is propelled by suction device 8 and is able to carry the $CO_2$ out of insect trap 1.

The intake air 10 flows into the trap 1 through intake port 40. The intake port 40 is located at the top end of the trap, between the top 6 and the sidewalls 4. The intake port 40 can include a flange 42 on its outer side that projects downward. As a result, the intake port 40 may itself be angled upward with respect to intake path 44. The intake path 44, thus, has an upward component.

On the other hand, the $CO_2$ lure 34 exits the trap 1 at its bottom through outlet lure port 36. The port 36 includes a lip 46 thereon which extends in an upward direction. Accordingly, the outlet lure port 36 is angled upward with respect to lure path 48.

Although intake path 44 projects upward with respect to the flow path, the path 44 extends in a downward direction with respect to the radial direction of the trap. Thus, with respect to geometry and not flow direction, the intake path and the lure path project toward one another with respect to an outward direction. This is shown in FIG. 1. The benefit of having the intake and lure paths project toward each other is that there is more likelihood that the insects which are drawn to the lure will be sucked into the trap by the intake air 10.

The waste air 14 may be separated from the $CO_2$ lure 34 so that it does not dilute the lure 34. In the illustrated embodiment the waste air 14 flows straight downward.

Figure 3:
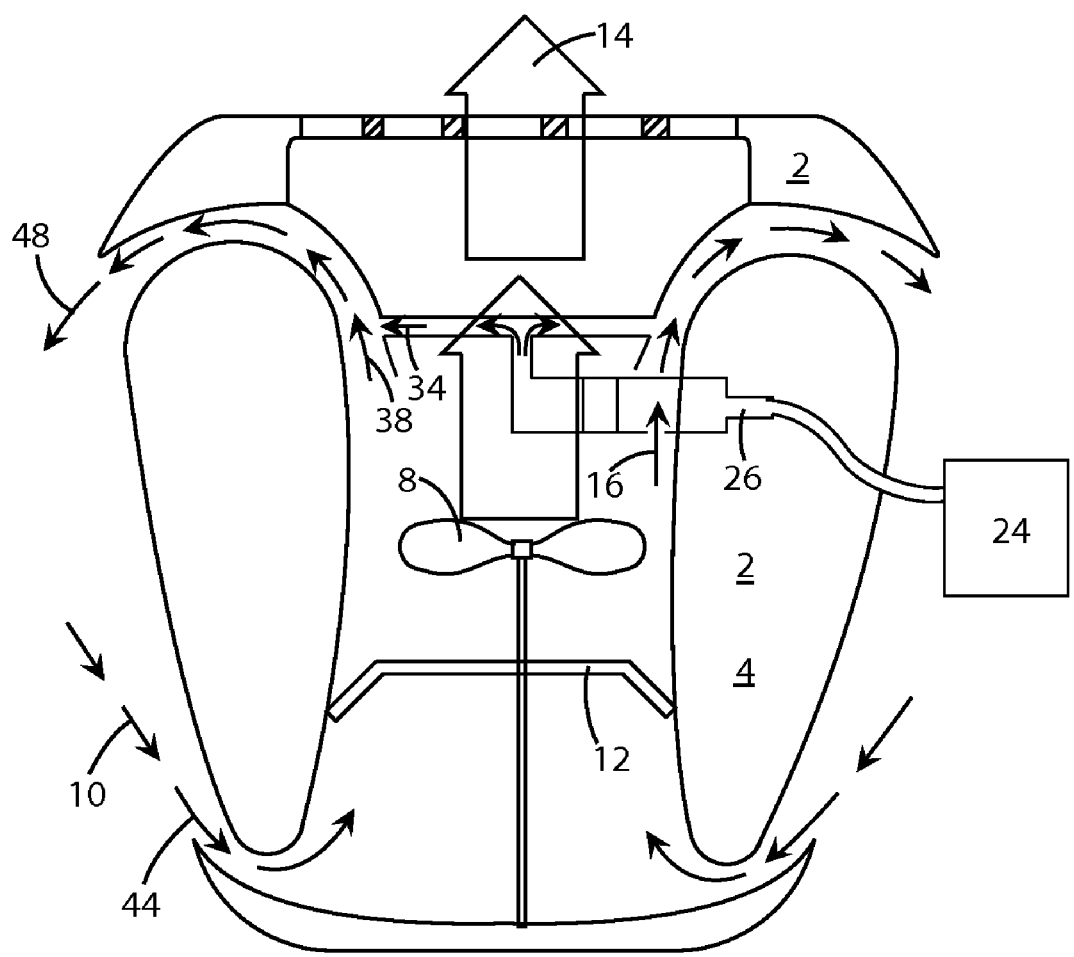
FIG. 3 is a cross sectional view of another embodiment of an insect trap according to the present invention.

FIG. 3 shows a similar embodiment in accordance with the invention to that shown in FIGS. 1 and 2. However, the intake air 10 is drawn into the housing 2 its bottom end. Additionally, the reactor 18 is disposed above the catch 12 and suction device 8. The $CO_2$ lure 34 is exhausted from the trap at the top end of the housing and the waste air 14 is projected in an upward direction. Nonetheless, the lure path 48 is directed toward intake path 44 to help lure insects into the intake air flow.

Although preferred forms of the invention has been shown and described, many features may be varied, as will readily be apparent to those skilled in this art.

We claim:

1. An insect lure trap comprising:
a housing with a first end and a second end and defining a length between said first end and said second end, an intake port adjacent the first end and an output port adjacent the second end;
a catch proximate the housing;
a suction device located within the housing and configured to draw air into the housing and supply air to the reactor;
a reactor located within the housing and configured to combust air directed by the suction device and fuel so as to produce $CO_2$;
the intake air port adjacent the first end being configured to form an intake path directed toward the first end; and
the outlet lure port adjacent the second end being configured to form a lure path directed at an acute angle with respect to the housing length toward the intake path.

2. The insect lure trap of claim 1 wherein the first end is a top end of the housing.

3. The insect lure trap of claim 1 wherein the second end is a bottom end of the housing.

4. The insect lure trap of claim 1 wherein the first end is a bottom end of the housing.

5. The insect lure trap of claim 1 wherein the second end is a top end of the housing.

6. The insect lure trap of claim 1 wherein the catch is inside the housing.

7. The insect lure trap of claim 1 wherein a first portion of the air drawn into the housing is supplied to the reactor and a second portion of the air drawn into the housing is exhausted as waste air.

8. The insect lure trap of claim 1 wherein a first portion of the air drawn into the housing is supplied to the reactor, a second portion of the air drawn into the housing carries the $CO_2$ through the outlet lure port, and a third portion of the air drawn into the housing is exhausted as waste air.

9. The insect lure trap of claim 1 wherein the reactor comprises a catalyst.

10. The insect lure trap of claim 1 wherein the reactor comprises a spark generator.

11. The insect lure trap of claim 1 wherein the intake air port is located between a top of the housing and a sidewall of the housing.

12. The insect lure trap of claim 11 wherein the intake air port includes a downwardly projecting flange on the top of the housing.

13. The insect lure trap of claim 1 wherein the suction device includes a fan.

14. An insect lure trap comprising:
a housing with a top end and a bottom end;
a catch inside the housing;
a suction device configured to draw air into the housing through the catch and divert a first portion of the air toward a reactor;
the reactor inside the housing configured to combust the first portion of the air with fuel so as to produce $CO_2$;
an intake air port adjacent the top end and configured to form an intake path having an upward component; and
an outlet lure port adjacent the bottom end and configured to form a lure path having an upward component directed toward the intake path.

15. The insect lure trap of claim 14 wherein the intake port is disposed around a circumference of the housing.

16. The insect lure trap of claim 14 further comprising a top flange adjacent the intake air port and configured to guide the intake air path in an upward direction; and
a bottom flange adjacent the outlet lure port and configured to guide the lure path in an upward direction.

17. The insect lure trap of claim 14 wherein the intake path has a radially inward component.

18. The insect lure trap of claim 14 wherein the lure port is disposed around a circumference of the housing.

19. The insect lure trap of claim 14 wherein the lure path has a radially outward component.

20. The insect lure trap of claim 14 wherein the outlet lure port is configured to direct a second portion of the air to mix with the $CO_2$ and sweep it out of the housing.

21. A method of catching insects comprising:
- drawing air and insects along an intake air path into a top end of an insect lure trap housing, the intake air path having an upward component;
- catching the insects in the air path;
- directing a first portion of the air into a reactor;
- mixing the first portion of air with fuel;
- combusting the first portion of air and fuel to form $CO_2$;
- exhausting the $CO_2$ along a lure path out of a bottom end of the insect lure trap housing, the lure path having an upward component directed toward the intake path.

22. The method of claim 21 further comprising directing a second portion of the air to sweep the $CO_2$ along the lure path.

23. The method of claim 21 further comprising initializing combustion of the air and fuel with a spark generator.

24. The method of claim 21 further comprising exhausting waste air down from the housing.

25. The method of claim 24 further comprising heating the waste air with the reactor.

* * * * *